(12) United States Patent
Su

(10) Patent No.: US 7,329,103 B2
(45) Date of Patent: Feb. 12, 2008

(54) COOLING FAN WITH BUILT-IN ADJUSTABLE SPEED

(75) Inventor: Steven Su, Taoyuan (TW)

(73) Assignee: Enermax Technology Corporation, Taoyuan (TW)

( * ) Notice: Subject to any disclaimer, the term of this patent is extended or adjusted under 35 U.S.C. 154(b) by 753 days.

(21) Appl. No.: 10/670,273

(22) Filed: Sep. 26, 2003

(65) Prior Publication Data

US 2005/0053492 A1     Mar. 10, 2005

(51) Int. Cl.
    *F04B 17/03*      (2006.01)
(52) U.S. Cl. ...................................... 417/326; 318/543
(58) Field of Classification Search ................. 417/326; 318/543
    See application file for complete search history.

(56) References Cited

U.S. PATENT DOCUMENTS

| 4,734,012 | A | * | 3/1988 | Dob et al. | 417/32 |
| 5,434,946 | A | * | 7/1995 | Barzilai et al. | 392/385 |
| 5,573,382 | A | * | 11/1996 | Girard | 417/326 |
| 5,713,030 | A | * | 1/1998 | Evoy | 340/584 |
| 5,847,526 | A | * | 12/1998 | Lasko et al. | 318/471 |
| 6,396,675 | B1 | * | 5/2002 | Su | 318/471 |

* cited by examiner

*Primary Examiner*—Michael Koczo, Jr.
(74) *Attorney, Agent, or Firm*—Troxell Law Office, PLLC

(57) ABSTRACT

A cooling fan with built-in adjustable speed structure of the invention is provided herein. The cooling fan of the invention fan has built-in fan speed controlling parts installed inside, in addition, has a fan speed controlling interface, such as a knob or a keystroke, positioned on the fan frame for a user to directly adjust fan speed as needed without additional wirings to be connected. The invention can be used at any environment where needs a cooling fan.

3 Claims, 6 Drawing Sheets

COOLING FAN WITH BUILT-IN ADJUSTABLE SPEED

BACKGROUND OF THE INVENTION

To achieve better cooling effect, general electric devices have at least one and/or above additional cooling fans installed inside whereon, so as to keep circulating air inside and outside the working environment of electric devices and exhale hot air from inside without causing instability of the systems due to high temperature.

General cooling fans in the past that utilized fixed rotating speeds, provided stable ventilation but sometimes failed to quickly and instantly exhale high heat resulting from heavy loaded operation of a computer system. Besides, some other cooling fans were designed to rotate with high speeds in order to heighten ventilation and achieve better cooling effect; nevertheless, such fans relatively incurred noise. Therefore, it is difficult for a user to use a fan with fixed high speed function to have better cooling results and also accept the noise interruption.

Recently some patent applicants develop fans with adjustable fan speed function. Such a fan enable a user to adjust quickly fan speed for exhaling heat from the inside of a electric device without additional extensive wirings to be connected to fan speed controlling parts; even when the fan speed needs to be slowed down the user can also adjust the fan to reduce noise.

However, the kind of fan with adjustable speed function needs an extended line to connect with other external electric parts, which are installed at other positions, so as to increase the complicity of the fan installation.

SUMMARY OF THE INVENTION

In view of the drawbacks, a new cooling fan with built-in adjustable speed structure of the invention comprises a fan frame for bearing weight, fixing blades, bearing and electric components controlling fan speed installed inside a stator frame of a PCB board, in addition, for positioning fan speed controlling interface, such as a knob or a touch switch, on the fan frame.

The advantages of the invention are shown as follows,

1. Extensive Utilization with High Compatibility:

The invention improves general cooling fans of prior arts by constructing electric components controlling fan speed on a PCB board of a fan stator; therefore, the fan appearance merely has a knob or switch for adjusting fan speed outside of the stator frame, the rest of components are compatible with general cooling fans. In addition, the invention only needs power cord without additional wirings and other electric components and parts needed to control the fan. The invention can be used at any environment where requires a cooling fan, such as a computer case, a switch power supply, an electric cabinet, an additionally connected peripheral or expansion cabinet, etc., and can be used with (or without) slight changes of the fan structure.

2. Easy Installation:

The fan speed controlling component is built in inside the fan, a user only needs a power cord for connecting the fan to appropriate socket without installing additional wirings or electric parts for controlling fan speed. The invention is easily installed and enables the decrease in wirings surrounding the system environment, so as to reduce the maintenance complexity.

3. Convenient Utilization:

A user can adjust fan speed through a controlling interface on the fan frame according to the requirements.

DETAILED DESCRIPTION OF THE PREFERRED EMBODIMENTS

A cooling fan with built-in adjustable speed structure of the invention (hereinafter referred to as a cooling fan) has the major structure thereof installed on a PCB board inside the fan for integrating variable resistor, in addition, has a manual fan speed controlling interface installed outside the fan stator frame for a user to adjust fan speed.

Figure 1:
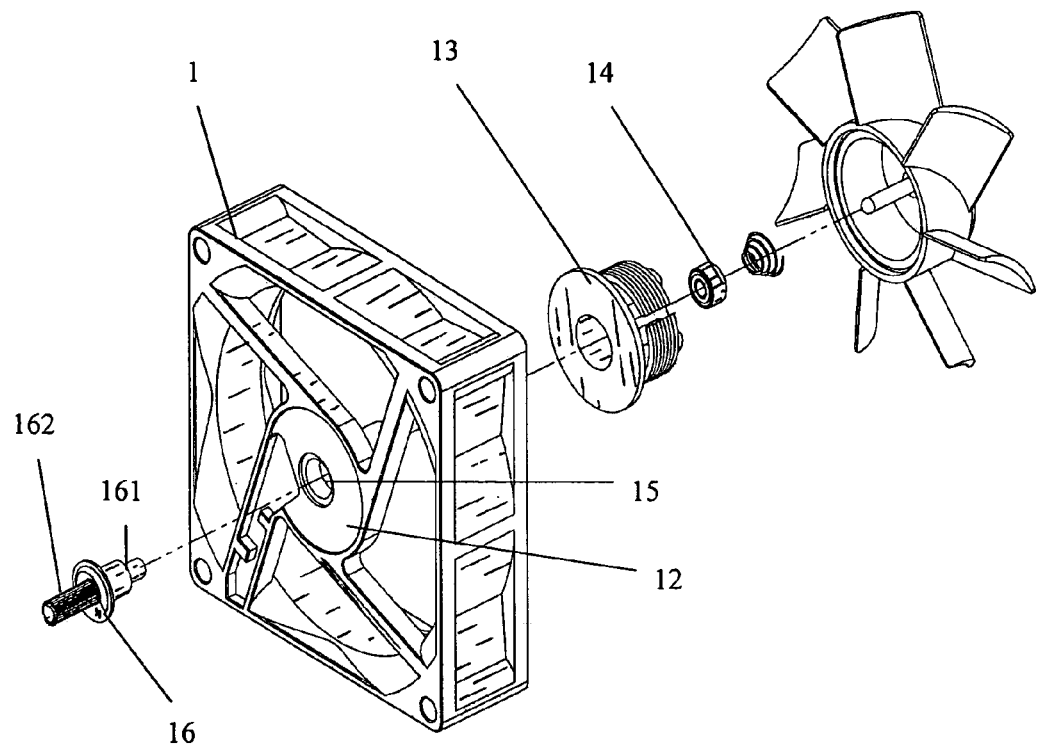
FIG. 1 is an exploded perspective view of a cooling fan with built-in adjustable speed structure of the invention.

As shown on FIG. 1, a cooling fan (1) of the invention has a fan frame. A fan PCB board (13) and a fan bearing (14) are installed inside a stator frame (12) for supporting a stator (not shown) of an electric motor (not shown). The stator frame (12) has a preset hole (15) for a socket (161) of a knob or a touch button (16) to connect to the PCB board (13). As shown in FIG. 1, a central hole in the PCB board (13) is aligned with the preset hole (15).

Figure 2:
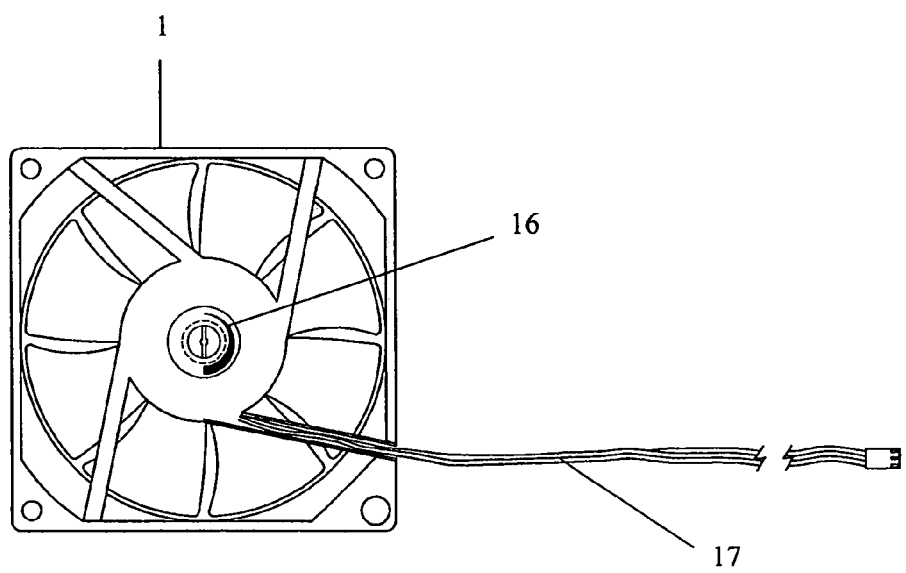
FIG. 2 is a front view showing an installed step-less knob controlling fan speed on the cooling fan of the invention.

As shown on FIG. 2, the cooling fan (1) has a knob or a touch button (16) installed outside the stator frame (12), enabling the front end (162) of the knob or the touch button exposed outside the stator frame (12). The power source can be connected to the power supply of a computer through the fan power cord (17). Therefore, the cooling fan can be controlled by the knob or the touch button (16) interface enabling a user to adjust fan speed of the cooling fan at any time without a huge change of the original fan structure, using method and fan positioning.

Figures 3A, 3B:
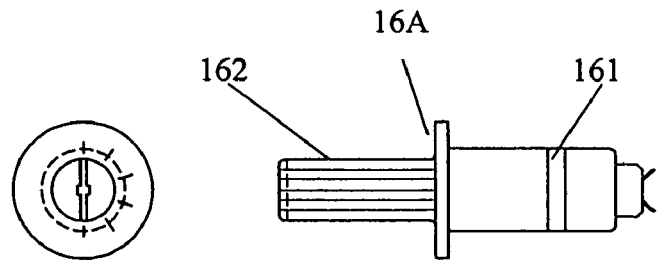
FIG. 3A is a front view showing stage control knob of the invention.
FIG. 3B is an end view showing stage control knob of the invention.
Figures 4A, 4B:
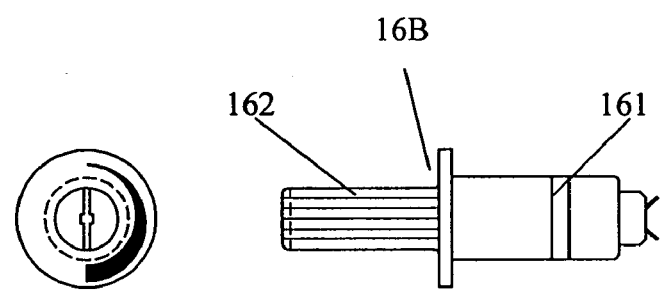
FIG. 4A is a front view showing step-less adjusting knob of the invention.
FIG. 4B is a step-less adjusting knob end view of the invention.
Figures 5A, 5B:
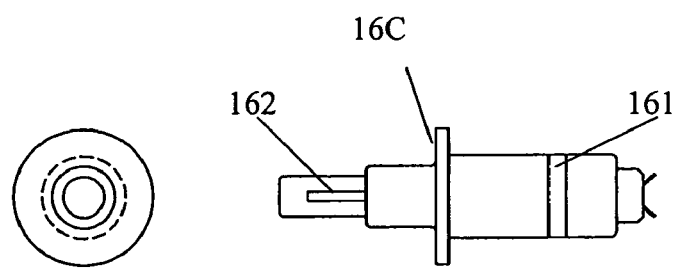
FIG. 5A is a front view showing a pushbutton switch of the invention.
FIG. 5B is a end view showing the pushbutton switch of the invention.

The knob or switch used for adjusting fan speed of the aforementioned fan is shown on FIGS. 3A and 3B showing stage control knob (16A), on FIGS. 4A and 4B showing a step-less adjusting knob (16B) and on FIGS. 5A and 5B showing pushbutton switch (16C). The various adjustable knobs or switches are included in the invention.

In view of the foregoing, the invention with various adjustable knobs or switches (16) additionally installed enables a user to adjust fan speed of the cooling fan (1) at any time without a huge change of the original fan structure, using method and fan positioning.

The cooling fan (1) with built-in adjustable speed structure of the invention can be installed at any environment where needs a cooling fan.

Figure 6:
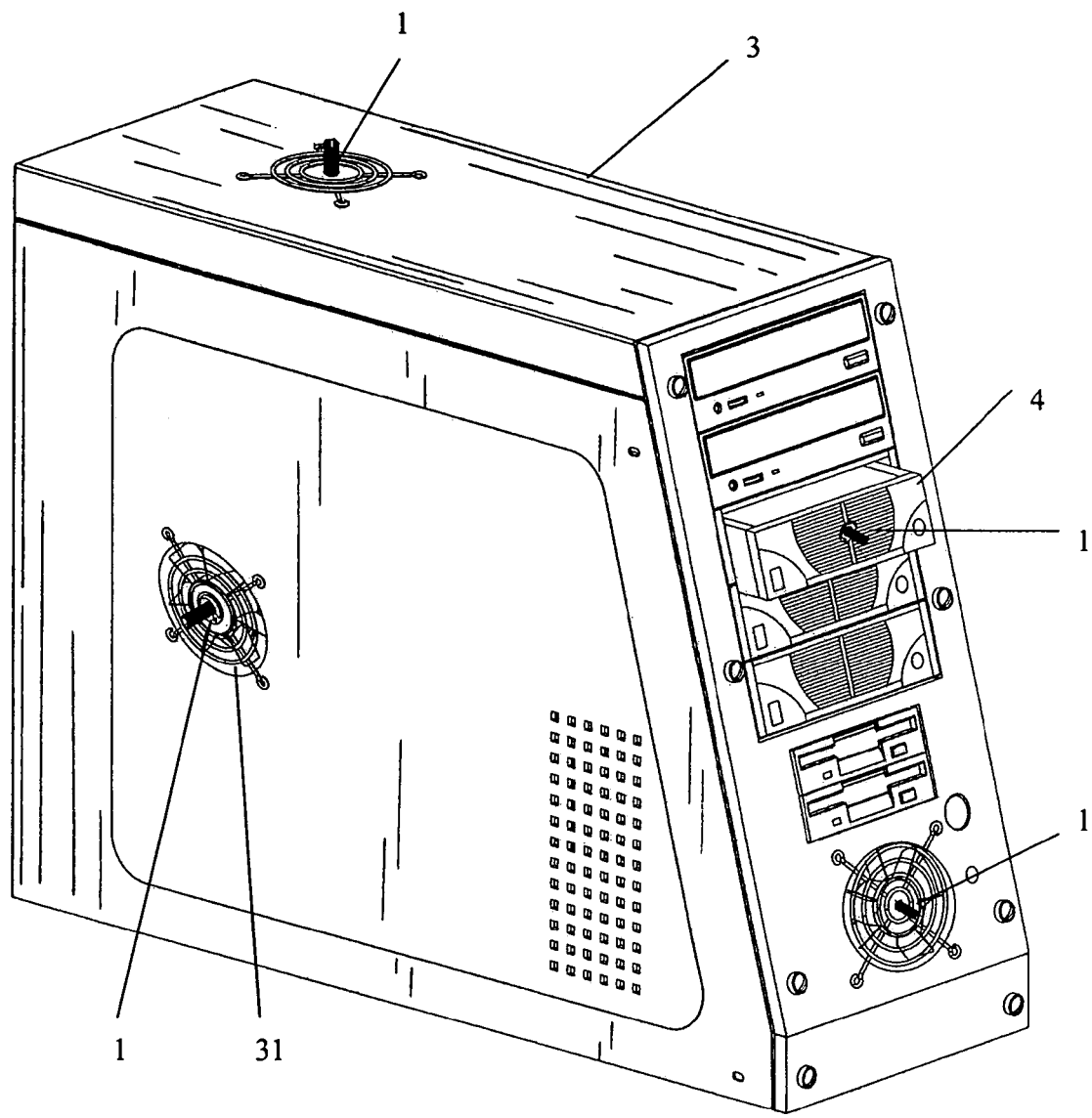
FIG. 6 is a perspective of an embodiment of the invention being used on a computer mainframe and a hot-swap HDD.

As shown on FIG. 6, the cooling fan (1) can be installed at the position of a fan hole (31) on a computer case (3), or used on HDD hot-swap box (4) respectively enabling a HDD inside a computer mainframe or HDD hot-swap box to be cooled down.

Figure 7:
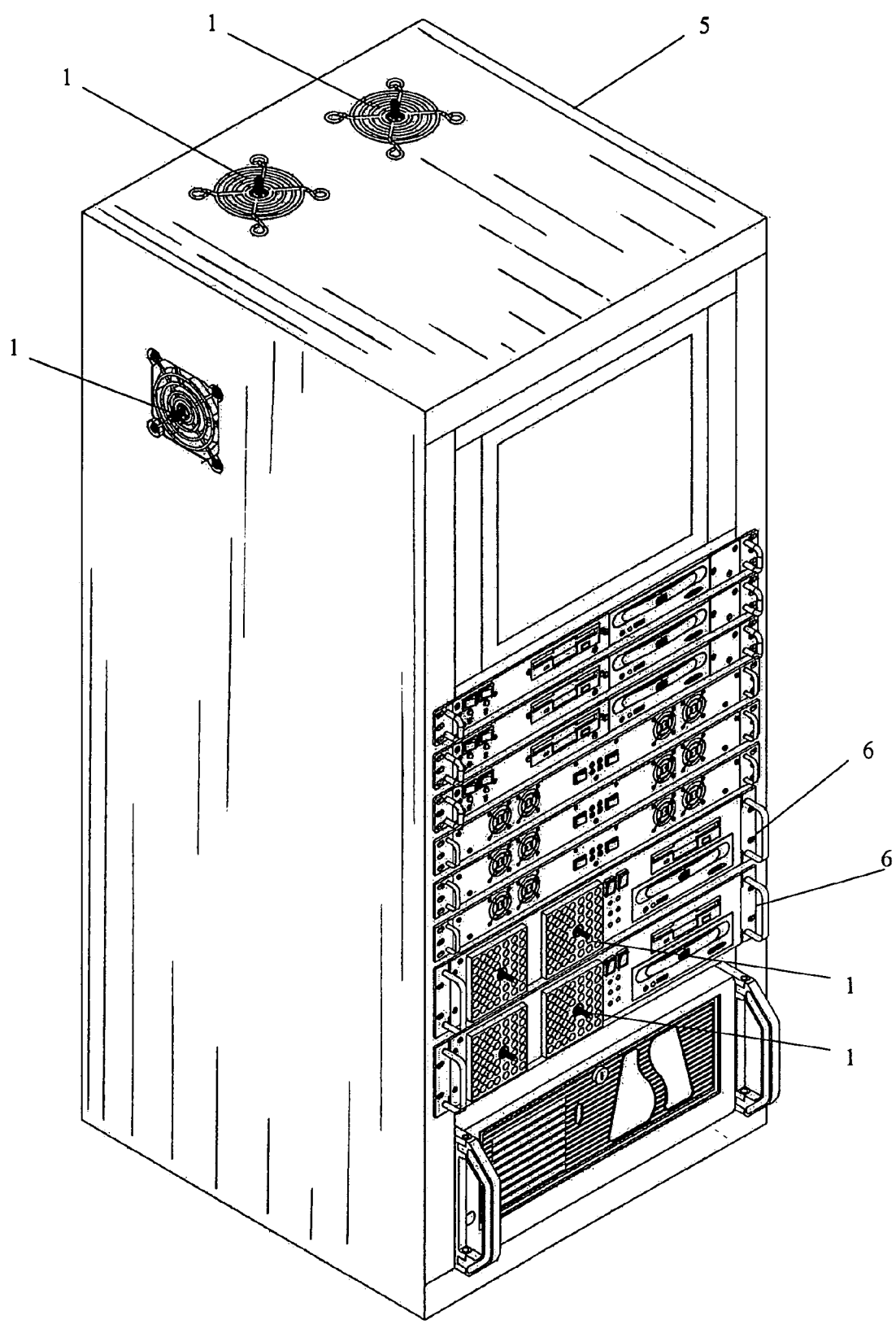
FIG. 7 is a perspective of another embodiment of the invention being used on a electric cabinet and a industrial electric cabinet.

As shown on FIG. 7, the cooling fan (1) can be installed in a electric cabinet (5) and a industrial electric cabinet (6).

Figure 8:
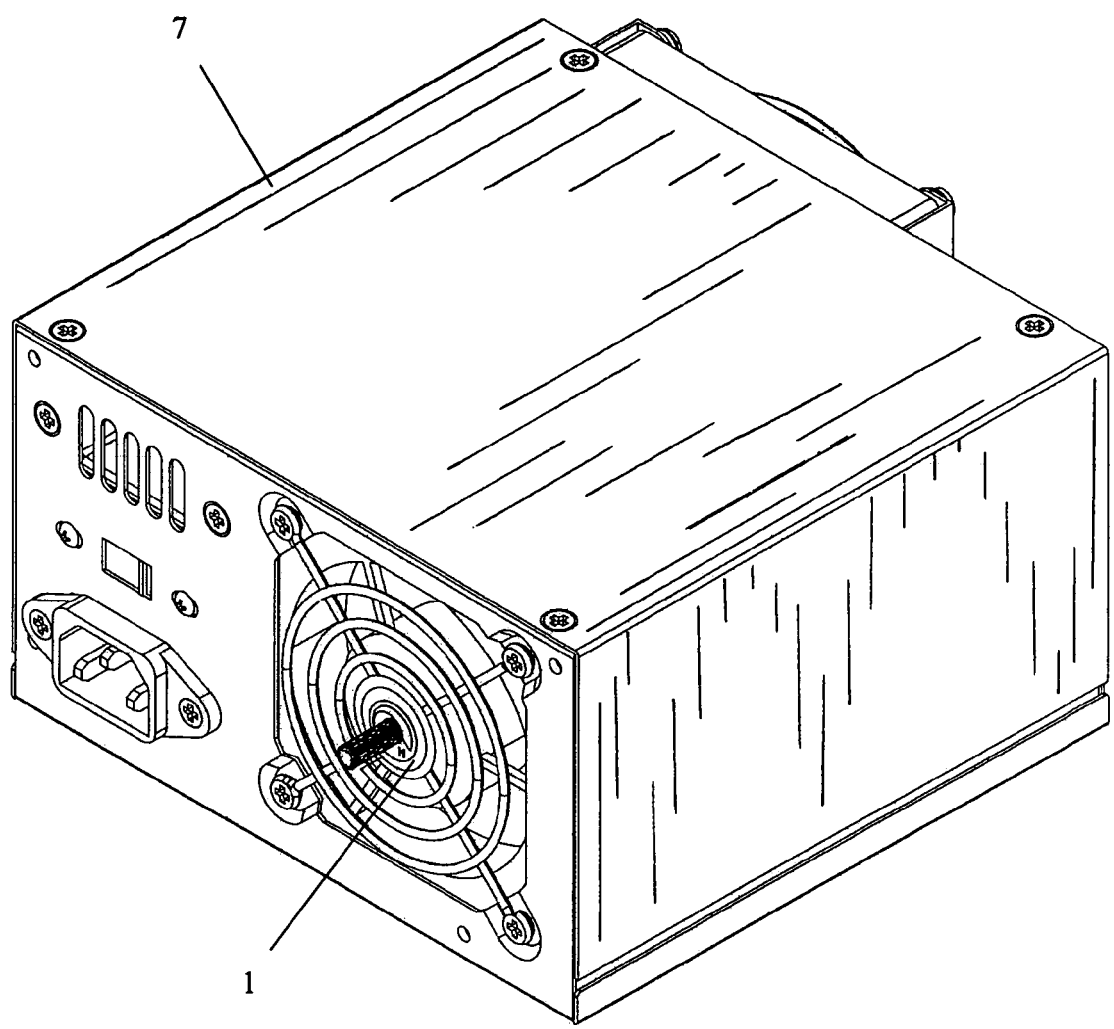
FIG. 8 is a perspective of another embodiment of the invention being used on a switch power supply.
Figure 9:
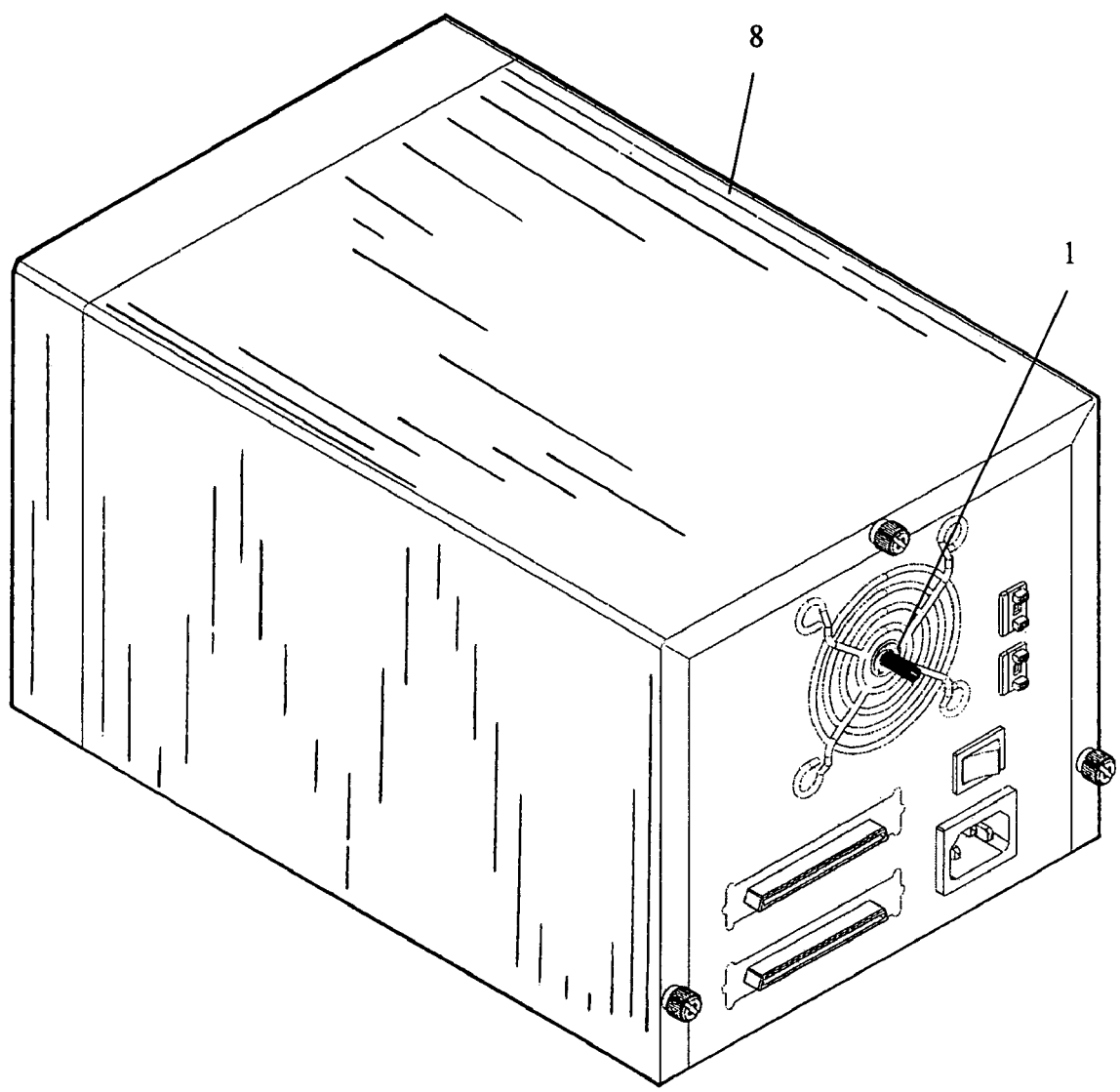
FIG. 9 is a perspective of another embodiment of the invention being used on a computer peripheral external box.

As shown on FIGS. 8 and 9, the cooling fan (1) of the invention can be used on a switch power supply (7) and a computer peripheral external box (8).

What is claimed is:

1. A cooling fan with a built-in adjustable speed structure, comprising:

a fan;

a fan frame supporting the fan;

a stator frame for supporting a stator of an electric motor powering the fan, the stator frame having a preset hole therein;

a PCB board including control electronics, the PCB board having a central hole aligned with the preset hole; and a manual fan speed control interface partially extending though the preset hole to connect with a variable resistor and the control electronics.

2. The cooling fan with built-in adjustable speed structure of claim 1, wherein the manual fan speed controlling interface is selected from the group consisting of a stage control knob, a step-less adjusting knob and a touch switch.

3. The cooling fan with built-in adjustable speed structure of claim 1, wherein the cooling fan is configured to be installed in an environment selecting from the group consisting of a computer case, a electric cabinet, a switch power supply, a peripheral external box and a HDD hot-swap box etc.

* * * * *